United States Patent Office 3,112,314
Patented Nov. 26, 1963

3,112,314
CERTAIN 1,4,7,9b-TETRAAZAPHENALENES AND PREPARATION THEREOF
John L. Van Winkle, Castro Valley, Calif., assignor to Shell Oil Company, New York, N.Y., a corporation of Delaware
No Drawing. Filed July 31, 1961, Ser. No. 127,797
9 Claims. (Cl. 260—256.4)

This invention relates to novel polycyclic heterocyclic compounds and to their preparation. More particularly, the invention relates to novel 1,4,7,9b-tetraazaphenalenes and to their preparation by selective dehydrogenation.

The reaction of alpha,beta-unsaturated aldehydes with ammonia is known to produce a variety of different types of compounds, depending on the conditions of the reaction. For example, when ammonia and acrolein are reacted in aqueous solution, the product is a white polymer called acrolein-ammonia; while under reductive conditions and high temperatures, the vapor phase reaction of these materials yields propyl amines. It has also been found that when ammonia and alpha,beta-unsaturated aldehydes such as acrolein are reacted in alcohol at elevated temperature and pressure dodecahydro-1,4,7,9b-tetraazaphenalenes of the structure

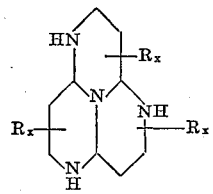

are obtained. In this structure, each R refers to a substituent on the aldehyde reactant, and each $x$ is an integer from 0 to 2, but preferably 1.

It is an object of this invention to provide novel unsaturated derivatives of the substituted dodecahydro-1,4,7,9b-tetraazaphenalenes. A further object is the provision of a process for the selective dehydrogenation of the decahydro-1,4,7,9b-tetraazaphenalenes. Still another object is the provision of novel substituted tetraazaphenalenes, and the catalytic preparation of such substituted tetraazaphenalenes under mild conditions of temperature and pressure is yet another object of the invention. Other objects will be apparent from the following description of the invention.

These objects are accomplished by heating a compound of the formula

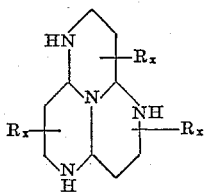

wherein each R is a monovalent radical selected from the group consisting of alkyl, cycloalkyl, aryl, alkaryl and aralkyl radicals, and each $x$ is an integer from 0 to 2, in contact with a hydrogenation catalyst, at a temperature between about 100° C. and about 350° C.

The saturated polycyclic heterocyclic compounds that are the starting materials are, as noted above, prepared by the reaction of alpha,beta-monounsaturated aldehydes with ammonia in alcohol at a temperature above about 80° C. and at superatmospheric pressure. By alpha,beta-monounsaturated aldehydes are meant those compounds of the structure

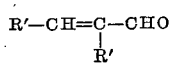

wherein each R' is selected from the group consisting of the hydrogen atom and alkyl, cycloalkyl, aryl, aralkyl and alkaryl radicals. Exemplary aldehydes are methacrolein; ethacrolein; crotonaldehyde; 2-butenal; 2-pentenal; 2-hexenal; 2-octenal; 2-nonenal; cinnammaldehyde; alpha-phenyl acrolein; alpha-benzyl acrolein and the like. Preferred aldehydes are those wherein each radical R' has no more than eight carbon atoms, while particularly preferred aldehydes are those wherein each substituent R' is lower alkyl, i.e., up to $C_4$. Most particularly preferred of these aldehydes is acrolein, since it is the most reactive and gives best results.

The alpha,beta-unsaturated aldehyde is reacted with ammonia in the liquid phase in an alcohol, under conditions of elevated temperature and pressure to form the dodecahydro-1,4,7,9b-tetraazaphenalene. By alcohols are meant alkanols such as methanol, ethanol, propanol, isopropanol, and the like, preferably lower alkanols; as well as polyols including ethylene glycol; propylene glycol; butanediol; 1,5-pentanediol; and 1,2,6-hexanetriol. The reaction is most effectively conducted under anhydrous conditions and in the presence of a molar excess of ammonia. Most effective concentration ratios are those between about 50 moles to about 200 moles of ammonia per mole of aldehyde. Temperatures between about 80° C. to about 200° C. are preferred, as are pressures from about 100 p.s.i.g. to about 5000 p.s.i.g.

The saturated 1,4,7,9b-tetraazaphenalenes obtained in this manner are light-colored or white crystalline solids, characterized by sharp melting points. The are miscible with water and such alcohols as methanol and ethanol, but are only moderately soluble in chlorinated solvents such as carbon tetrachloride. Exemplary compounds are the 2,5,8 - trialkyl - dodecahydro - 1,4,7,9b - tetraazaphenalenes, such as 2,5,8 - trimethyl - dodecahydro-1,4,7,9b - tetraazaphenalene; 2,5,8 - triisobutyl - dodecahydro - 1,4,7,9b - tetraazaphenalene; and 2,5,8 - tributyl - dodecahydro - 1,4,7,9b - tetraazaphenalene; and such aromatic substituted compounds as 2,5,8-triphenyl-dodecahydro-1,4,7,9b-tetraazaphenalene. Corresponding compounds substituted in the 3, 6 and 9 positions include 3,6,9 - trimethyl - dodecahydro - 1,4,7,9b - tetraazaphenalene and 3,6,9 - triphenyl - dodecahydro - 1,4,7,9b-tetraazaphenalene.

These compounds are selectively dehydrogenated by heating them in the liquid phase in contact with a hydrogenation catalyst at a temperature of from about 100° C. to about 250° C. The most satisfactory catalysts to use, because of the ease with which they may be separated from the reaction system, are the solid hydrogenation catalysts. Such catalysts are preferably selected from metals of groups I, II and IV through VIII of the periodic table, their alloys and derivatives such as their sulfides, oxides and chromites. Examples include silver, copper, iron, manganese, molybdenum, platinum, chromium, cobalt, rhodium, tungsten, mixtures of metals, such as copper-silver mixtures, copper-chromium mixtures, nickel-cobalt mixtures and their derivatives such as copper oxide, copper chromite, nickel sulfide, silver sulfide, and the like. Particularly preferred catalysts are the members of the group consisting of nickel, copper, cobalt, iron, chromium, silver, palladium and platinum, and their oxides, sulfide and chromites. Members of the platinum and palladium metal triads, e.g., ruthenium, rhodium and palladium; and osmium, iridium and platinum, are especially effective catalysts. These catalysts may be employed in a finely divided form and dispersed in and throughout the reaction mixture, or they may be employed in a more massive state, either in essentially the pure state or supported upon or carried by an inert carrier material such as pumice, kieselguhr, diatomaceous earth, clay, alumina, charcoal, carbon or the like, and the reaction mixture contacted therewith as by flowing the mixture over or through a bed of the catalyst or according to other methods known in the art.

The amount of the catalyst employed may vary over a considerable range depending upon the type of catalyst employed, the specific saturated tetraazaphenalene, the temperatures and pressures, and the like. In general, the amount of the catalyst ranges from about .1% to 35% by weight of the cyclic compound but amounts ranging from about 1% to 15% are more preferred. Depending on the several variables involved, it will be found that the catalyst may be recovered and reused for several batches before it becomes necessary to recharge and/or replace it.

The dehydrogenation may be conducted with the aid of inert solvents. Exemplary solvents include the paraffins, e.g., pentane, isopentane, hexane, heptane, isooctane, and the like, or aromatic liquids, such as benzene, toluene, xylene, cumene, etc. While the dehydrogenation may be conducted at superatmospheric or subatmospheric pressures, it has been found that it goes smoothly at or near atmospheric pressure, e.g., 760 mm. Hg, and therefore this pressure region is preferred.

The reaction may be conducted in any suitable apparatus of the type that is conventionally employed for hydrogenation processes. Thus, for example, the saturated tetraazaphenalene, catalyst and solvent, if desired, are charged to an autoclave or other reaction vessel and heated. After the dehydrogenation is complete, the reaction product is separated from the catalyst and recovered.

Surprisingly, catalytic treatment of the substituted saturated tetraazaphenalenes in this manner does not result in the destruction of the tricyclic structure, as would be expected, but rather in its selective dehydrogenation to afford compounds of the structure

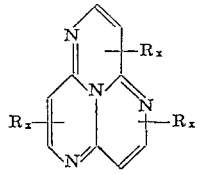

where R and x have the above meanings.

Representative products include the 2,5,8-trialkyl-1,4,7, 9b-tetraazaphenalenes, such as 2,5,8-trimethyl-1,4,7,9b-tetraazaphenalene; 2,5,8-triethyl-1,4,7,9b-tetraazaphenalene; 2,5,8-tripropyl-1,4,7,9b-tetraazaphenalene; 2,5,8-tributyl-1,4,7,9b-tetraazaphenalene, and the like; and the 3, 6,9-trialkyl-1,4,7,9b-tetraazaphenalenes, such as 3,6,9-trimethyl-1,4,7,9b-tetraazaphenalene; 3,6,9-tripropyl-1,4,7, 9b-tetraazaphenalene; and 3,6,9-tripentyl-1,4,7,9b-tetraazaphenalene; as well as the corresponding 2,5,8-triphenyl and 3,6,9-triphenyl compounds. Exemplary hexa-substituted tetraazaphenalenes and 2,3,5,6,8,9-hexamethyl-1,4,7, 9b-tetraazaphenalene; 2,3,5,6,8,9-hexabutyl-1,4,7,9b-tetraazaphenalene; and 2,3,5,6,8,9-hexatolyl-tetraazaphenalene.

In contrast to their saturated precursors, these compounds are brightly colored crystalline compounds, useful as dyes, coloring agents, color filter components, and the like. Since in aqueous solution, they undergo color changes which are pH-dependent, they are particularly useful as acid-base indicators. Because of their amine structure, the substituted tetraazaphenalenes of the invention are useful as curing agents for epoxy resins. When used in soil, they decompose slowly to release ammonia, and thus serve as agricultural chemicals. They may also be employed as chemical intermediates in the preparation of other agricultural chemicals such as fertilizers, fungicides, pesticides, and the like; and in the preparation of other dyes and indicators.

The following examples will illustrate the novel compounds of the invention and the manner in which they may be prepared. It should be understood, however, that these examples are merely illustrative, and are not to be regarded as limitations to the appended claims, since the basic teachings thereof may be varied at will, as will be understood by one skilled in the art. In the examples, the proportions are expressed in parts by weight unless otherwise indicated.

*Example I*

2,5,8-trimethyl-dodecahydro-1,4,7,9b-tetraazaphenalene was prepared by dissolving crotonaldehyde in an equal volume of methanol, and pumping the resulting solution and ammonia continuously to a reactor heated to 150° C. and at a pressure of 1500 p.s.i.g. The $NH_3$/crotonaldehyde molar ratio was 11/1. The resulting product was obtained by distilling off the solvent.

To a flask equipped with stirring and a gas-measuring device was charged 44.8 g. (0.2 mole) of the 2,5,8-trimethyl-dodecahydro-1,4,7,9b-tetraazaphenalene and 4 g. of 10% w. carbon-supported palladium metal catalyst. One gram more of catalyst was added during the run. The mixture was maintained at about 130–175° C. until evolution of hydrogen (9.49 liters) had ceased. The product was a purple-colored solid having a melting point of 192.5–193° C., obtained in 52% yield.

The product, identified as 2,5,8-trimethyl-1,4,7,9b-tetraazaphenalene, was soluble in water. The aqueous solution had main peaks at 243, 333, 342 and 359 m$\mu$.

Analysis of the compound gave the following results:

|  | Percent w. | | |
| --- | --- | --- | --- |
|  | C | H | N |
| Calculated for $C_{12}H_{12}N_4$ | 67.9 | 5.7 | 26.4 |
| Found | 68.0 | 5.7 | 26.5 |

When aqueous hydrochloric acid was added to a purple neutral solution of the 2,5,8-trimethyl-1,4,7,9b-tetraazaphenalene, the solution turned yellow when the pH of the mixture fell beneath 7.

*Example II*

Using the technique of the previous experiment, acrolein and ammonia were reacted together in methanol at 150° C. and 1500 p.s.i.g. in a mole ratio of 11 $NH_3$/1 acrolein to yield dodecahydro-1,4,7,9b-tetrazaphenalene. The compound was a white crystalline material having a melting point of 118–120° C.

To a flask as in the above experiment was charge 55.2 g. (0.30 mole) of the dodecahydro-1,4,7,9b-tetraazaphenalene and 2 g. of 10% palladium on carbon catalyst. The mixture was heated at 140–180° C. until all evolution (6.7 liters) of hydrogen ceased. The product was a purple viscous oil.

Upon crystallization from methanol, extraction with carbon tetrachloride, and Claisen distillation, 4.5 g. of a purple solid was obtained. This was extracted with isopentane and sublimed to afford a purified purple solid having a melting point of about 95° C. Analysis showed it to be 1,4,7,9b-tetraazaphenalene.

*Example III*

As in the above experiments, methacrolein was reacted with ammonia to yield 3,6,9-trimethyl-dodecahydro-1,4,7, 9b-tetraazaphenalene.

To a flask fitted with stirring and gas-measuring means was charged 157.5 g. (0.703 mole) of this material and 2 g. of 10% w. palladium on carbon catalyst. The mixture was heated at 138–178° C. with stirring until evolution of hydrogen (20.2 liters) ceased. Upon work-up, the product was found to be 3,6,9-trimethyl-1,4,7,9b-tetraazaphenalene, in purple-brownish crystalline form.

*Example IV*

Cinnamic aldehyde and ammonia in a mole ratio of 11 moles of ammonia per mole of aldehyde were reacted in methanol at about 150° C. and 1500 p.s.i.g. to yield 2,5,8-triphenyl-dodecahydro-1,4,7,9b-tetraazaphenalene.

When this compound is heated at 130–160° C. with 10% w. of Raney nickel catalyst, the product is 2,5,8-triphenyl-1,4,7,9b-tetraazaphenalene.

Example V 2,3,5,6,8,9 - hexamethyl - dodecahydro - 1,4,7,9b - tetraazaphenalene is prepared from 2-methyl-2-butenal and ammonia, reacted together in methanol at 200° C. and 2000 p.s.i.g.

This compound is readily dehydrogenated by heating it at 150° C. in contact with 5% w. Raney nickel to afford 2,3,5,6,8,9-hexamethyl-1,4,7,9b-tetraazaphenalene.

I claim as my invention:
1. The compound of the structure

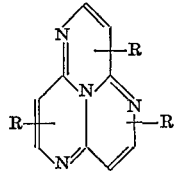

where each R is hydrocarbon alkyl of up to 8 carbon atoms.

2. The compound of the formula

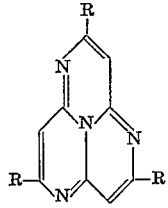

where each R is hydrocarbon alkyl of up to 8 carbon atoms.

3. The compound of claim 2 where each R is methyl.
4. The compound of the formula

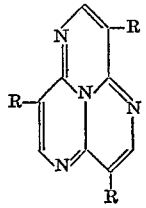

where each R is hydrocarbon alkyl of up to 8 carbon atoms.

5. The compound of claim 4 where each R is methyl.
6. The process for the preparation of a 1,4,7,9b-tetraazaphenalene which comprises heating a compound of the formula

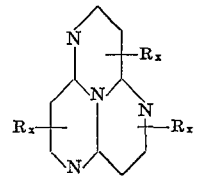

where each R is a monovalent hydrocarbon radical of up to 8 carbon atoms selected from the group consisting of alkyl and phenyl radicals, and $x$ is an integer from 0 to 2, in contact with a hydrogenation catalyst, at a temperature between about 100° C. and about 350° C.

7. The process of claim 6 wherein the hydrogenation catalyst is palladium.

8. The process for the preparation of 1,4,7,9b-tetraazaphenalene comprising heating dodecahydro-1,4,7,9b-tetraazaphenalene in contact with a hydrogenation catalyst at a temperature between about 100° C. and about 350° C.

9. The process for the preparation of 2,5,8-trimethyl-1,4,7,9b-tetraazaphenalene comprising heating 2,5,8-trimethyl-dodecahydro-1,4,7,9b-tetraazaphenalene in contact with a hydrogenation catalyst at a temperature between about 100° C. and about 350° C.

References Cited in the file of this patent

Delepine: Compt. Rend., 216, 785 (1943).
Morton: Chemistry of Heterocyclic Compounds (New York, 1946), pages 190–191.
Hickinbottom: Reactions of Organic Compounds (London, 1948), pages 6–7.
Patterson et al.: The Ring Index (Washington, D.C., 1960), page 431.